US007892123B2

(12) United States Patent
Nakamichi et al.

(10) Patent No.: US 7,892,123 B2
(45) Date of Patent: Feb. 22, 2011

(54) ROTATIONAL FORCE TRANSMISSION MEMBER MOUNTING STRUCTURE

(75) Inventors: Katsuhiro Nakamichi, Saitama (JP); Koichi Tsutsumi, Saitama (JP); Shinya Nishiyama, Saitama (JP); Hiroyuki Uchida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 830 days.

(21) Appl. No.: 10/998,718

(22) Filed: Nov. 30, 2004

(65) Prior Publication Data

US 2005/0137040 A1  Jun. 23, 2005

(30) Foreign Application Priority Data

Dec. 8, 2003 (JP) ............... 2003-409240

(51) Int. Cl.
*F16C 3/06* (2006.01)
(52) U.S. Cl. .................... 474/94; 411/544
(58) Field of Classification Search ............ 474/94; 74/409, 440, 443; 411/544
See application file for complete search history.

(56) References Cited

U.S. PATENT DOCUMENTS 3,188,775 A * 6/1965 Cosmos ............ 474/94
5,560,267 A * 10/1996 Todd et al. .......... 74/604
6,065,943 A * 5/2000 Suito et al. ......... 417/362
6,161,512 A * 12/2000 Beels Van Heemstede ...... 123/90.31

FOREIGN PATENT DOCUMENTS

| JP | 47-20545 A | 9/1972 |
| JP | 58-50314 U | 4/1983 |
| JP | 59-24561 U | 2/1984 |
| JP | 59-47127 U | 3/1984 |
| JP | 7-259577 A | 10/1995 |

\* cited by examiner

*Primary Examiner*—Richard W Ridley
*Assistant Examiner*—Terence Boes
(74) *Attorney, Agent, or Firm*—Birch, Stewart, Kolasch & Birch, LLP

(57) ABSTRACT

The present invention relates to a mounting structure for mounting firmly onto a rotating shaft a rotational force transmission member such as a chain sprocket, a gear, a belt pulley and the like. A drive sprocket as a rotational force transmission member is fitted into an end of the rotating shaft in a splined manner. A coned disc spring and a washer are positioned in sequence onto an outer face of the rotational force transmission member. The coned disc spring and the washer are supported and sandwiched by the screw fastening member to be screwed to an end of the rotating shaft and the rotational force transmission member.

24 Claims, 4 Drawing Sheets

ROTATIONAL FORCE TRANSMISSION MEMBER MOUNTING STRUCTURE

CROSS-REFERENCE TO RELATED APPLICATIONS

The present application claims priority under 35 USC 119 to Japanese Patent Application No. 2003-409240 filed on Dec. 8, 2003 the entire contents of which are hereby incorporated by reference.

BACKGROUND OF THE INVENTION

1. Field of the Invention

The present invention relates to a mounting structure for rigidly mounting a rotational force transmission member such as a chain sprocket, a gear, a belt pulley and the like onto a rotating shaft.

2. Background of the Invention

In Japanese Patent Laid-Open No. Hei. 7-259577, a gear 47 is fitted into an end of a crankshaft 17 in an internal combustion engine in a splined manner. A washer 48 is placed on the gear 47 at an outer face thereof with a bolt 49 passing through the washer 48 and being screwed into the crankshaft 47 at the center of one end thereof.

In a gear mounting structure described in Japanese Patent Laid-Open No. Hei. 7-259577, the gear 47 is fitted into an end of the crankshaft 17 in a splined manner so that a torque is securely transmitted from the crankshaft 17 to the gear 47. However, since there exists a small amount of backlash along the circumferential direction between the crankshaft 17 and the gear 47, when fluctuations in torque and loading for the crankshaft 17 and gear 47 are respectively generated, these fluctuations can possibly influence the bolt 49. Accordingly, there is a structure is needed that reduces the influence caused by the fluctuations in the torque and the loading for the crankshaft 17 and gear 47, respectively. Likewise, Japanese Patent Laid-Open No. Hei. 7-259577 discloses the structure employing a washer 48 as a fastening member. However, even though a coned disc spring is employed in place of the washer 48, a similar result to that for the washer is obtained.

SUMMARY AND OBJECTS OF THE INVENTION

Accordingly, the present invention relates to an improvement in the gear mounting structure, i.e., the rotational force transmission member mounting structure as described above. Even though a fluctuation in the torque from the crankshaft is generated, it is an object of the present invention to provide a structure that is capable of further reducing the transmission of the torque to the bolt due to the influence caused by the fluctuation in the torque.

The present invention provides a rotational force transmission member that is fitted into an end of a rotating shaft in a splined manner. A coned disc spring and a washer are stacked in sequence onto a face at an outer end of the rotational force transmission member. The coned disc spring and the washer are supported by, and interposed between, a screw fastening member to be screwed into an end of the rotating shaft and the rotational force transmission member.

The present invention provides an outer circumferential edge of the coned disc spring that is in line contact with an outer face of the rotational force transmission member and an inner circumferential edge of the coned disc spring that is in line contact with a face at an inner side of the washer.

The present invention provides an outer circumferential portion at an inner side of the washer that is notched off in a ring shape with the coned disc spring being disposed in the portion notched off in the ring shape.

According to the present invention, the rotational force transmission member is fitted into the rotating shaft at the end thereof in a splined manner with the coned disc spring and the washer being stacked in sequence on the face at the end of the rotational force transmission member. The coned disc spring and the washer are supported by, and interposed between the screw fastening member to be screwed into the end of the rotating shaft and the rotational force transmission member. Therefore, even though a relatively minute vibration in the circumferential direction between the end of the rotating shaft and the rotational force transmission member is generated in the portion where both are fitted into each other in a splined manner due to the backlash in the circumferential direction, it is possible to further reduce an influence due to the relatively minute vibration on the screw fastening member, by a relative slip between the outer end of the rotational force transmission member and the inner end of the coned disc spring as well as a relative slip between the outer end of the coned disc spring and the inner end of the washer.

According to the present invention, the outer and inner circumferential edges of the coned disc spring are respectively in line contact with the outer face of the rotational force transmission member and the inner side of the washer along the circumferential direction. Therefore, even though there are a large number of asperities over these contacted portions therebetween hence creating a large frictional coefficient, the inner and outer circumferential edges of the coned disc spring are locally pressed in a large magnitude onto the outer face of the rotational force transmission member and the inner side of the washer along the circumferential direction, thereby causing the asperities of both contacted portions to be flattened and smoothened, accordingly leading the frictional coefficients thereof to be greatly reduced.

According to the present invention, since a portion notched off in a ring shape is formed in the outer circumferential edge at the inner side of the washer and the coned disc spring is then disposed in the portion notched off in a ring shape in the washer, the coned disc spring is securely positioned against the washer in a concentric position. Therefore, aligning the center of the coned disc spring with each center of the rotational force transmission member and the washer is maintained with high accuracy.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment for the rotational force transmission member mounting structure with respect to the present invention will be described hereinafter with reference to FIGS. 1 to 4.

Figure 1:
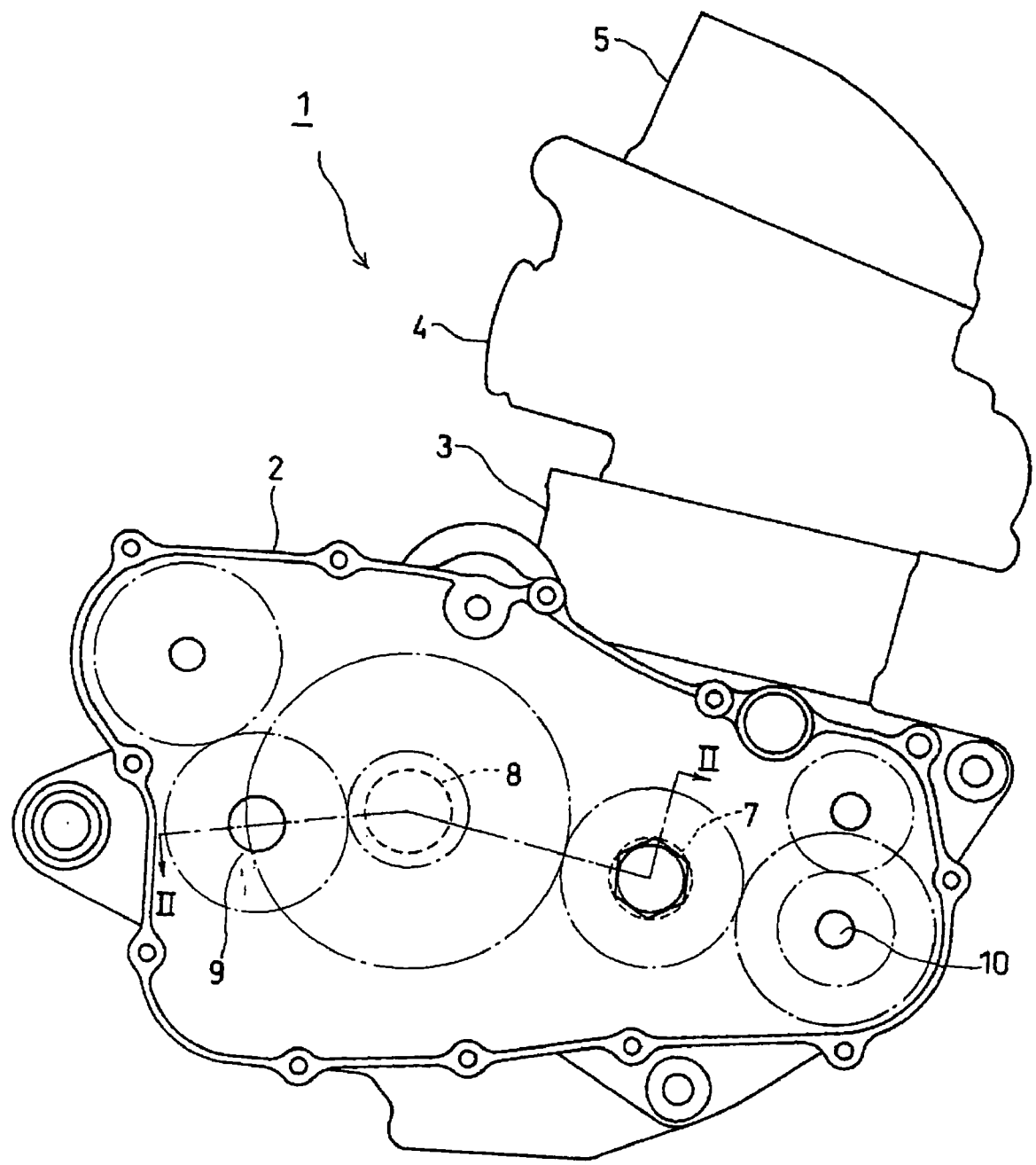
FIG. 1 illustrates a side view of an internal combustion engine having an embodiment of a rotational force transmission member mounting structure according to the present invention.

In FIG. 1, an internal combustion engine 1 is adapted for mounted on a motorcycle, which is not illustrated, and consists of a four-stroke single-cylinder internal combustion engine. In the main body of the internal combustion engine 1, a cylinder block 3, a cylinder head 4 and a cylinder head cover 5 are stacked in sequence on a crankcase 2 made of aluminum alloy all of which are joined together in one unit.

Figure 2:
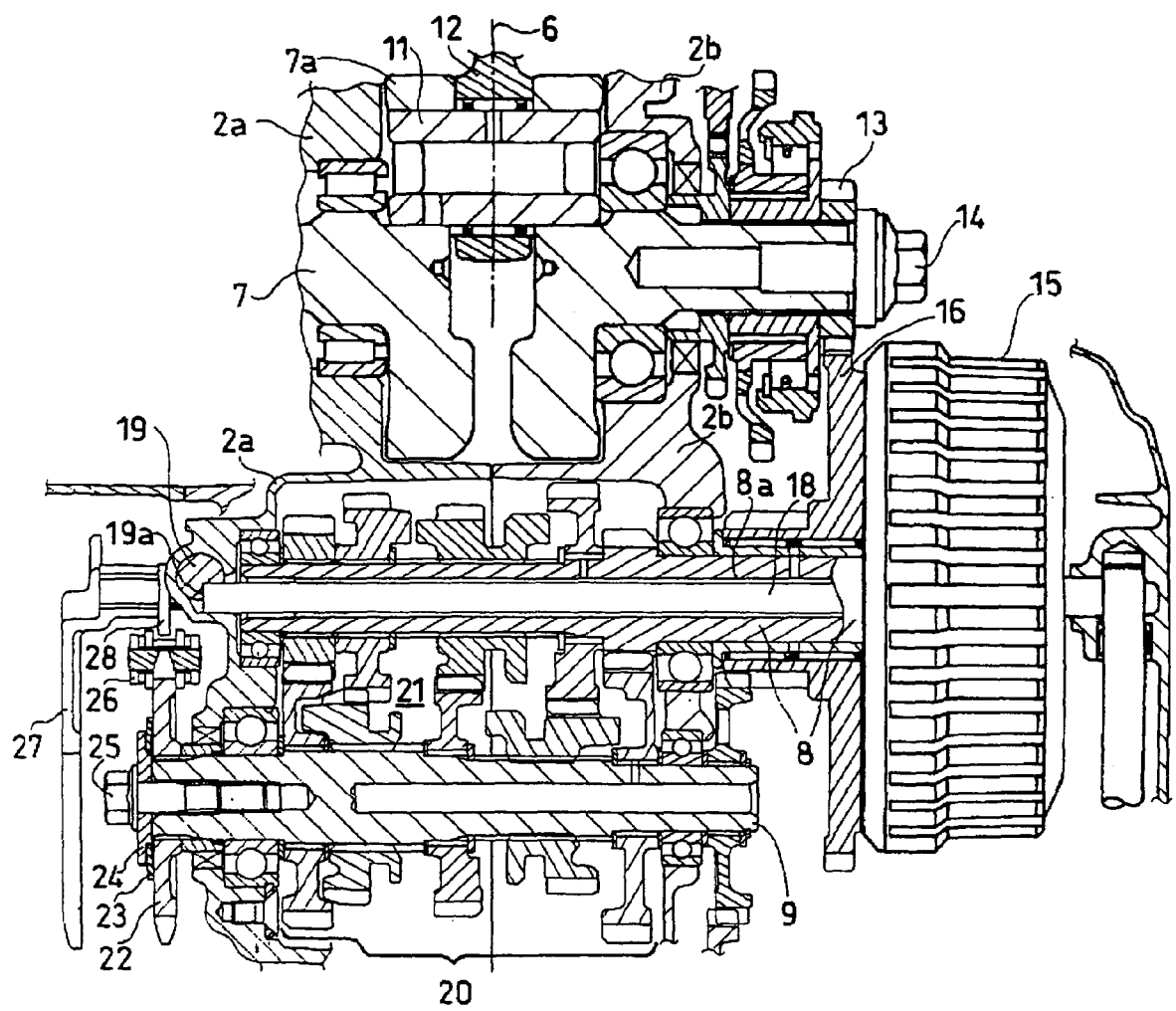
FIG. 2 illustrates a section view taken along the line II-II in FIG. 1.

As illustrated in FIG. 2, the crankcase 2 is separated into two parts, a left part and a right part, along a plane which passes through a cylinder hole center line 6 with the plane being formed directed to the front and back of the vehicle. A crankshaft 7, a main shaft 8, a countershaft 9 and a balancer shaft 10, each of which are directed in the width direction of the vehicle perpendicular to the above separation plane, are pivotably supported on the left and right half bodies 2a and 2b of the crankcase.

In the cylinder block 3, a cylinder hole, which is not illustrated, includes a cylinder hole center line 6 as a center formed therein, and a piston (not shown) is fitted into the cylinder hole and is freely slidably in an up-and-down direction. An upper end and a lower end of a connecting rod 12 are pivotably fitted into a piston pin, which is not illustrated, which is inserted into the piston in parallel to the crankshaft 7 with a crank pin 11 being inserted into a crank web 7a of the crankshaft 7 in parallel to the crankshaft 7. The piston is pushed downwardly due to the combustion of gaseous mixture in a combustion chamber located above the cylinder hole so that the crankshaft 7 is driven in rotation in the clockwise direction as shown FIG. 1.

As shown in FIG. 2, the drive gear 13 is fitted into the right end of the crankshaft 7 in a splined manner and is combined therewith by use of a bolt 14. The rotational force transmission member mounting structure, which will be described hereinafter, can also be applied to the connection portion formed between the crankshaft 7 and the drive gear 13.

Likewise, a multi-plate clutch 15 is disposed at the right end of the main shaft 8 with a driven gear 16 being located at an input side of the multi-plate clutch 15 and being pivotably fitted into the main shaft 8 of the multi-plate clutch 15. The main shaft 8 is formed as a hollow shaft, and a push rod 18 is inserted into the center hole 8a of the main shaft and is freely slidably in the right-and-left direction. A clutch cam 19 is adjacent to the left end of the push rod 18 and is pivotably fitted into the left crankcase 2a in a direction perpendicular to the driven gear 16. A notch 19a is a quarter of a circle in shape and is formed in the cylindrical-shaped clutch cam 19 with the push rod being pushed in the right direction through a rotation of the clutch cam 19 in a counterclockwise direction. Thus, the multi-plate clutch 15 is caused to be interrupted from being connected.

Furthermore, a large number of transmission gears 20 are provided to the main shaft 8 and the countershaft 9 so as to constitute a gearbox 21. An engagement of the transmission gear 20 is selected through movement of the transmission gear 20 in the axial direction by means of a shifter, which is not illustrated, so that the gearbox 21 can be switched to a required gear ratio.

A drive sprocket 22 is fitted into the left end of the countershaft 9 in a splined manner with a ring-shaped coned disk spring 23 being positioned on the outer face of the drive sprocket 22. A washer 24 is further positioned on the outer face of the coned disk spring 23 with a bolt 25 being passed through the washer 24 and being rigidly screwed into the center portion at the left end of the countershaft 9. A seamless chain 26 is bridged between the drive sprocket 22 and a driven sprocket connected to a rear axle, which is not illustrated.

The rotational force transmission member, the screw fastening member, the coned disc spring and the washer according to the present invention, respectively, correspond to the drive sprocket 22, the bolt 25, the coned disc spring 23 and the washer 24.

Figure 3:
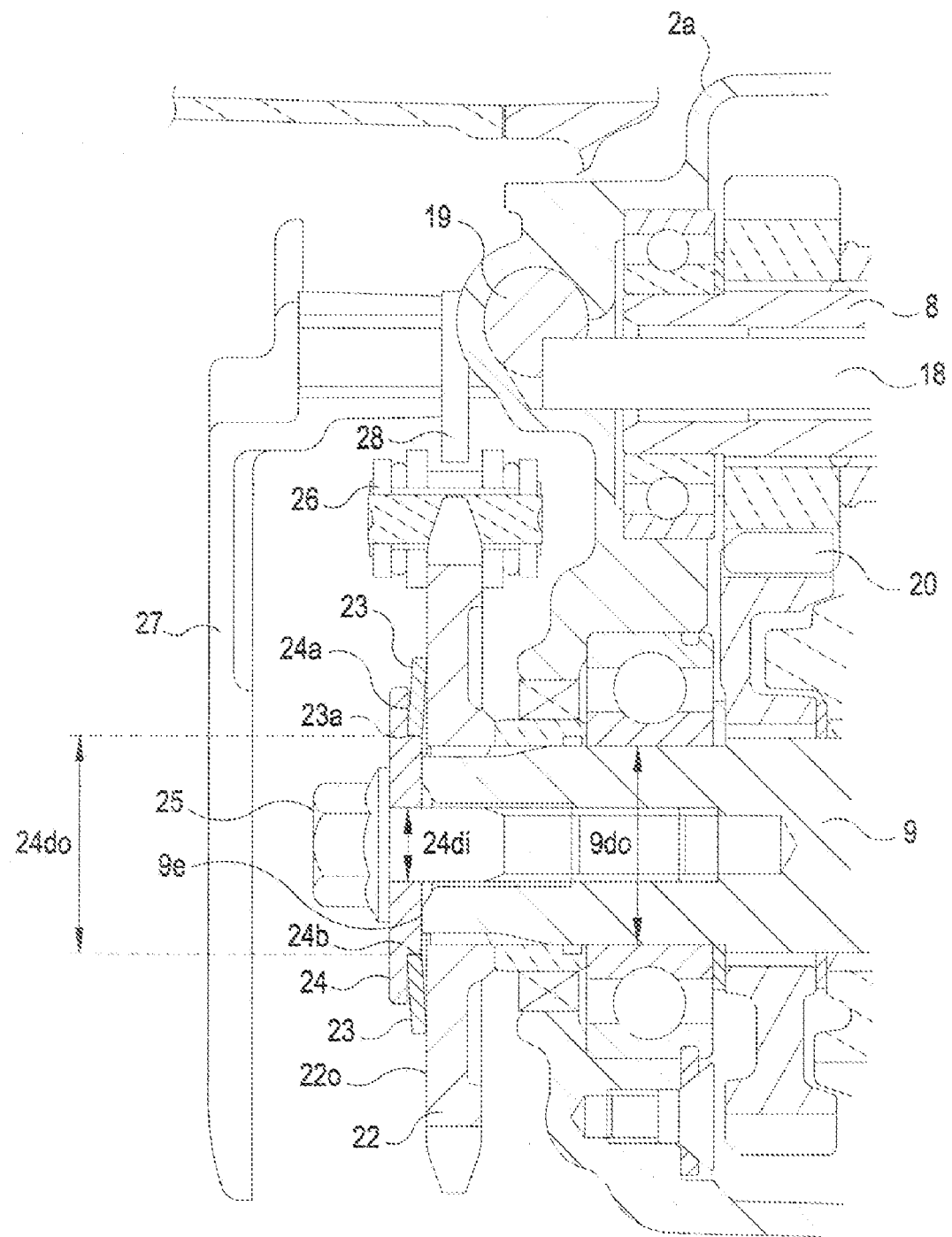
FIG. 3 illustrates an enlarged section view of a portion in FIG. 2.
Figure 4:
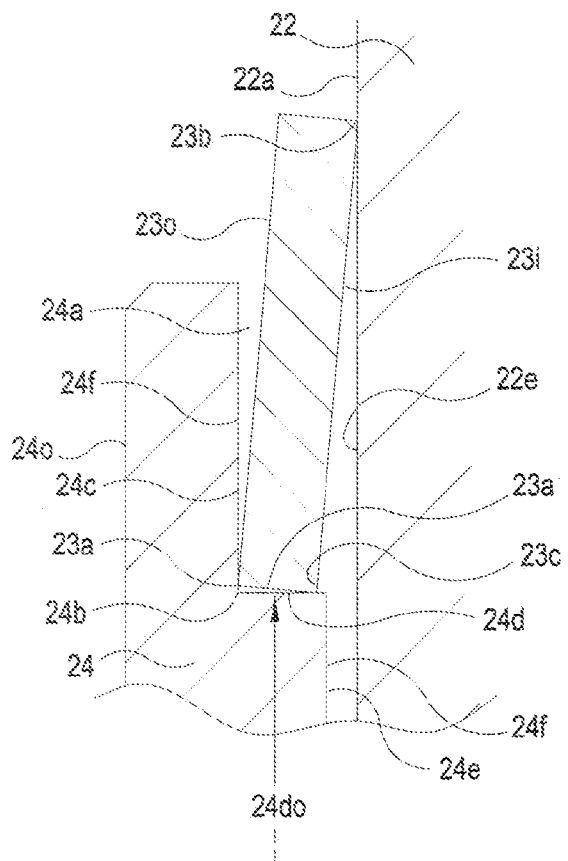
FIG. 4 illustrates a further enlarged section view of a portion in FIG. 3.

As shown in FIG. 3, the coned disc spring 23 is formed along a surface of a cone having the vertex angle slightly less than 180 degree. As can be seen in FIG. 4, washer 24 includes a ring-shaped notch 24a, an inner corner portion 24b, an inner side 24f having an outer circumferential portion 24c, and an inner circumferential portion 24e, and face 24d formed along a circumferential direction for the ring-shaped notch 24a of washer 24. With regard to the washer 24, the ring-shaped notch 24a is formed along the outer circumferential edge at the inner side 24f of a thick circular plate of the washer 24 in such a manner that an inner circumferential edge 23a at the outer face of the coned disc spring 23 can be gently fitted into an inner circumferential corner portion 24b of the ring-shaped notch 24a of the washer 24. Such a washer 24 is generally referred to as a stepped washer 24.

A chain dropping-off prevention section 28 is joined in advance with a sprocket protection cover 27. This sprocket protection cover 27 is provided so that it is removably attachable to the left crankcase 2a.

The embodiment as shown in FIGS. 1 to 4 is so arranged as described above that, when the internal combustion engine 1 is actuated and is in a driving mode, the crankshaft 7 is rotated in a clockwise direction in FIG. 1. When the multi-plate clutch 15 is set in a connecting mode, a driving force produced by the internal combustion engine 1 is transmitted to the drive sprocket 22 from the crankshaft 7 via the drive gear 13, the driven gear 16, the multi-plate clutch 15, the main shaft 8, the transmission gear 20 and the countershaft 9, and is further transmitted to the rear wheel, which is not illustrated, via the seamless chain 26 being engaged with the drive sprocket 22.

In the driving mode of the internal combustion engine 1, the mixed gases in the combustion chamber, which is not illustrated, combusts every two rotations of the crankshaft 7 and a torque applied on the crankshaft 7 intermittently and considerably fluctuates. Therefore, even though a dumping means is incorporated in the multi-plate clutch 15, a friction plate of the multi-plate clutch 15 and the like absorb in part a fluctuation in the torque. However, the fluctuation in the torque is still transmitted to the countershaft 9. Further, a backlash does exists in the portion at which the countershaft 9 and the drive sprocket 22 are fitted into each other in a splined manner, hence creating a small relative vibration along the circumferential direction between the countershaft 9 and the drive sprocket 22.

However, as shown in FIG. 4 in the present embodiment, the outer circumferential edge 23b at the inner side 23i of the coned disc spring 23 is in line contact with the outer face 22o of the drive sprocket 22 and the inner circumferential edge 23a at the outer side 23o of the coned disc spring 23 is also in line contact with the outer circumferential portion 24c of inner face 24f along the ring-shaped notch 24a of the washer 24. As can be seen in FIGS. 3 and 4, the inner side 23i of the coned disc spring 23 makes direct contact only with an outer face 22o of the rotational force transmission member 22, and an outer circumferential edge 23b at an inner the inner side 23i of the coned disc spring 23 is the only portion of the coned disc spring 23 making contact with the rotational force transmission member 22. Therefore, a load per unit area in a large magnitude is applied over these line contact portions under which load a small relative vibration along the circumferential direction between the drive sprocket 22 and the washer 24 brings a surface of each line contact portion to a flat and smooth surface, thus causing the frictional coefficient thereof to be reduced. In consequence, the reduction of the frictional coefficient lowers the influence of the small vibration along the circumferential direction to the bolt 25.

Moreover, the inner circumferential edge 23c at the inner side of the coned disc spring 23 is positioned with a face 24d along a circumferential direction for the ring-shaped notch 24a of the washer 24 such that the center of the coned disc spring 23 aligns with each center of the washer 24 and the drive sprocket 22, thus enabling to maintain with the coned disc spring 23 a high absorbing effect for absorbing the small relative vibration along the circumferential direction.

Furthermore, as the washer 24 is thick, there is no possibility of causing the washer 24 to be deformed due to a spring reaction force generated by the coned disc spring 23. Thus, the washer 24 can be rigidly be fitted to the countershaft 9 with the bolt 25.

It is particularly effective when a mounting structure for the sprocket, such as a rotational force transmission member, is adapted to be applied to the drive sprocket 22 at an input side of the sprocket for an internal combustion engine 1 in which irregular rotations are apt to occur. In addition, the mounting structure for the sprocket is provided on an output side of the sprocket for an axle for which operating resistance fluctuates due to the irregularity of a road surface. Such a case is described in this embodiment.

Figure 5:
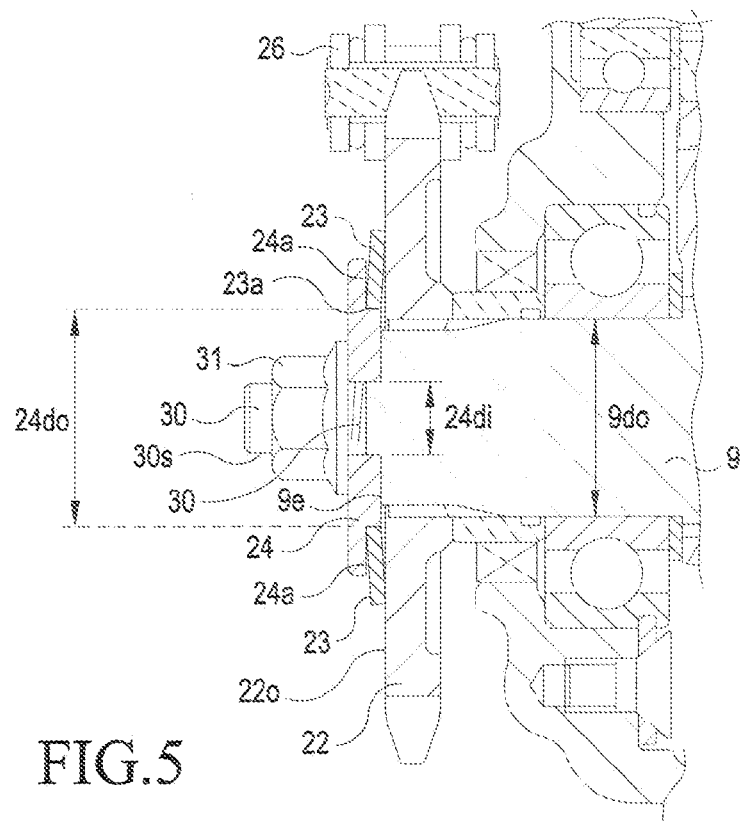
FIG. 5 illustrates a section view of the other embodiment.

In the embodiment as shown in FIGS. 1 to 4, the coned disc spring 23 and the washer 24 are mounted on the countershaft 9 by rigidly screwing the bolt 25 into the end of the countershaft 9. In particular, bolt 25 is mounted on the countershaft shaft 9 and makes direct contact with an outer face 24o of the washer 24 and presses an inner side 24f of the washer 24 against the coned disc spring 23 and the end face 9e of the countershaft 9. However, it is also possible to realize the arrangement as disclosed in the present invention in such a way as shown in FIG. 5, wherein a male screw 30 is provided at the left end of the countershaft 9 in a projecting manner and a nut 31 is then screwed to the screw portion 30s of male screw 30. Washer 24 has an inner diameter 24di that is substantially the same as the outer diameter of the screw portion 30 of male screw 30 (See FIG. 5), and substantially the same as the screw portion (not shown) of bolt 25 (See FIG. 3). Also, as can be seen in FIGS. 3 and 5, the inner circumferential portion 24d of washer 24 is formed with an outer diameter 24do that is larger than the outer diameter 9do of countershaft 9.

Elements in FIG. 5 that are indicated by reference numerals that are the same as the reference numerals as indicating by the corresponding elements in FIGS. 1 to 4 are identical.

In the embodiment as shown in FIG. 5, it is possible to obtain a similar effect as that obtained by the embodiment as shown in FIGS. 1 to 4 and to securely align the washer 24 with the male screw 30 integral with the countershaft 9.

While the drive sprocket 22 is adapted as a rotational force transmission member in the present embodiment, a pulley and a gear are also adaptable. In the above embodiment, although a four-stroke engine is illustrated, a two-stroke engine is also applicable.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rotational force transmission member mounting structure, comprising:
   a rotational force transmission member (22) fitted onto an end face (9e) of a rotating shaft (9) in a splined manner;
   a coned disc spring (23) stacked onto the rotational force transmission member (22);
   a washer (24) stacked onto and making direct contact with both the coned disc spring (23) and the end face (9e) of the rotary shaft (9); and
   a screw fastening member (25/31) adapted to be mounted on the rotating shaft (9) and making direct contact with an outer face (24o) of the washer (24), and pressing an inner side of the washer (24) against the coned disc spring (23) and the end face (9e) of the rotary shaft (9);
   wherein an inner side (23i) of the coned disc spring (23) making direct contact only with an outer face (22o) of the rotational force transmission member (22), and an outer circumferential edge (23b) at the inner side (23i) of the coned disc spring (23) is the only portion of the coned disc spring (23) making contact with the rotational force transmission member (22),
   wherein an outer circumferential portion (24c) at the inner side (24f) of the washer (24) is notched off in a ring shape, and the coned disc spring (23) is disposed in the portion that is notched off in the ring-shape, and
   wherein said rotational force transmission member (22) is a drive sprocket splined to said rotating shaft (9).

2. The rotational force transmission member mounting structure according to claim 1, wherein the outer circumferential edge of the coned disc spring is in line contact with the outer face of the rotational force transmission member and an inner circumferential edge of the coned disc spring is in line contact with a face at an inner side of the washer.

3. The rotational force transmission member mounting structure according to claim 1 wherein an outer side of the washer makes direct contact only with the screw fastening member.

4. The rotational force transmission member mounting structure according to claim 1, wherein the outer face of the rotational force transmission member where said coned disc spring and said washer are mounted is a single outer face.

5. The rotational force transmission member mounting structure according to claim 1, wherein said washer includes an inner circumferential corner portion for receiving an inner circumferential edge at an outer face of the coned disc spring therein.

6. The rotational force transmission member mounting structure according to claim 1, wherein said rotational force transmission member extends a predetermined distance relative to said rotating shaft, and
   wherein the outer circumferential portion of the washer is disposed radially outward with respect to an inner circumferential portion of the washer, and said cone disc spring is mounted relative to the portion notched off formed in said washer for enabling the outer circumferential edge of said coned disc spring to engage the outer face of said rotational force transmission member at a point displaced a predetermined distance from said rotating shaft.

7. The rotational force transmission member mounting structure according to claim 1, wherein said coned disc spring is positioned so as to engage the outer face of the rotational force transmission member which enables absorption of relative vibration along a circumferential direction.

8. The rotational force transmission member mounting structure according to claim 1, wherein a male screw portion extends from the end face of the rotating shaft, and said screw fastening member is threaded on said male screw portion for securing said washer relative to said rotating shaft.

9. The rotational force transmission member mounting structure according to claim 1, wherein the washer includes an inner circumferential corner portion that is disposed radially outward with respect to an outer diameter of the rotating shaft.

10. The rotational force transmission member mounting structure according to claim 1, wherein said rotating shaft includes a female screw, and a male screw portion is part of said fastening member, and
wherein the male screw portion is capable of passing through an inner diameter of said washer and of engaging with said female screw of the rotating shaft in order to secure said washer relative to said rotating shaft.

11. The rotational force transmission member mounting structure according to claim 1, when the mounting structure is assembled,
the coned disc spring is sandwiched between and makes direct contact with both the outer circumferential portion of the washer and the outer face of the rotational force transmission member.

12. The rotational force transmission member mounting structure according to claim 1,
wherein an inner circumferential portion of the washer has an inner diameter which is substantially equal to a diameter of a male screw portion, and
the inner circumferential portion of the washer having has an outer diameter which is larger than an outer diameter of the rotating shaft, and
when the mounting structure is assembled, the inner circumferential portion of the washer is capable of pressing against at least the end face of the rotating shaft.

13. A rotational force transmission member mounting structure, comprising:
a rotational force transmission member (22) mounted on an end of a rotating shaft (9);
a coned disc spring (23) having an inner face (23$i$) and an outer face (23$o$), the coned disc spring being (23) stacked onto an outer face (22$o$) of the rotational force transmission member (22) so that the inner face (23$i$) of the coned disc spring (23) makes direct contact only with an outer face (22$o$) of the rotational transmission member (22), and an outer circumferential edge (23$b$) at the inner side (23$i$) of the coned disc spring (23) is the only portion of the coned disc spring (23) making contact with the rotational force transmission member (22); and
a washer (24) having an inner side (24$f$) with an outer circumferential portion (24$c$) and an outer side (24$o$) opposite to the inner side (24$f$), the washer (24) being stacked onto the coned disc spring (23) so that the outer circumferential portion (24$c$) of the inner side (24$f$) of the washer (24) makes direct contact with at least a portion of the outer face (23$o$) of the coned disc spring (23); and a screw fastening member (25/31) adapted to be secured to the end of the rotating shaft (9) and making direct contact with the outer side (24$o$) of the washer (24),
the washer (24) being rigidly fitted to the rotating shaft (9) with the screw fastening member, and the coned disc spring (23) being rotatable with respect to the washer and the rotational force transmission member (22),
wherein the washer (24) having an inner circumferential portion (24$e$) on the inner side (24$f$) thereof, the inner circumferential portion (24$e$) of the washer (24) and the outer circumferential portion (24$c$) of the washer (24) being on different planes with respect to each other,
wherein said rotational force transmission member (22) is a drive sprocket (22) splined to said rotating shaft (9).

14. The rotational force transmission member mounting structure according to claim 13, wherein an outer circumferential edge of the coned disc spring is in line contact with the outer face of the rotational force transmission member and an inner circumferential edge of the coned disc spring is in line contact with a face at an inner side of the washer.

15. The rotational force transmission member mounting structure according to claim 13, wherein the outer circumferential portion at the inner side of the washer is notched off in a ring shape and the coned disc spring is disposed in the portion notched off in the ring-shape.

16. The rotational force transmission member mounting structure according to claim 13, wherein the outer face of the rotational force transmission member where said coned disc spring and said washer are mounted is a single outer face.

17. The rotational force transmission member mounting structure according to claim 13, wherein said washer includes an inner circumferential corner portion for receiving an inner circumferential edge at an outer face of the coned disc spring therein.

18. The rotational force transmission member mounting structure according to claim 13, wherein said rotational force transmission member extends a predetermined distance relative to said rotating shaft, and
wherein the outer circumferential portion of the washer is disposed radially outward with respect to the inner circumferential portion of the washer, and said cone disc spring is mounted relative to a ring shaped recess formed in the outer circumferential portion of said washer for enabling an outer circumferential edge of said coned disc spring to engage the outer face of said rotational force transmission member at a point displaced a predetermined distance from said rotating shaft.

19. The rotational force transmission member mounting structure according to claim 13, wherein said coned disc spring is positioned so as to engage the outer face of the rotational force transmission member which enables absorption of relative vibration along a circumferential direction.

20. The rotational force transmission member mounting structure according to claim 13, wherein a male screw portion extends from the outer end face of the rotating shaft, and said fastening member is threaded on said male screw portion for securing said washer relative to said rotating shaft.

21. The rotational force transmission member mounting structure according to claim 13, wherein the washer includes an inner circumferential corner portion that is disposed radially outward with respect to an outer diameter of the rotating shaft.

22. The rotational force transmission member mounting structure according to claim 13, wherein said rotating shaft includes a female screw, and a male screw portion is part of said fastening member, and wherein the male screw portion is capable of passing through an inner diameter of said washer and of engaging with said female screw of the rotating shaft in order to secure said washer relative to said rotating shaft.

23. The rotational force transmission member mounting structure according to claim 13, when the mounting structure is assembled, the coned disc spring is sandwiched between and makes direct contact with both the outer circumferential portion of the washer and the outer face of the rotational force transmission member.

24. The rotational force transmission member mounting structure according to claim 13, wherein an inner circumferential portion of the washer has an outer diameter which is larger than an outer diameter of the rotating shaft, and when the mounting structure is assembled, the inner circumferential portion of the washer is capable of pressing against at least the end face of the rotating shaft.

\* \* \* \* \*